(12) United States Patent
Agrawal et al.

(10) Patent No.: US 7,873,840 B2
(45) Date of Patent: Jan. 18, 2011

(54) SYSTEM AND METHOD FOR ORDER-PRESERVING ENCRYPTION FOR NUMERIC DATA

(75) Inventors: Rakesh Agrawal, San Jose, CA (US); Gerald George Kiernan, San Jose, CA (US); Srikant Ramakrishnan, San Jose, CA (US); Yirong Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/166,351

(22) Filed: Jul. 2, 2008

(65) Prior Publication Data

US 2008/0282096 A1    Nov. 13, 2008

(51) Int. Cl.
*G06F 11/30* (2006.01)
*G06F 7/00* (2006.01)
(52) U.S. Cl. .................. 713/193; 707/803; 707/804
(58) Field of Classification Search ............ 707/998.02, 707/803, 804; 713/193
See application file for complete search history.

(56) References Cited

U.S. PATENT DOCUMENTS

| | | | |
|---|---|---|---|
| 5,077,793 A | | 12/1991 | Falk et al. |
| 5,673,316 A | | 9/1997 | Auerback et al. |
| 5,719,941 A | | 2/1998 | Swift et al. |
| 5,724,573 A | * | 3/1998 | Agrawal et al. ....... 707/999.006 |
| 5,734,885 A | * | 3/1998 | Agrawal et al. ....... 707/999.003 |
| 5,930,789 A | * | 7/1999 | Agrawal et al. ............ 707/758 |
| 6,094,651 A | * | 7/2000 | Agrawal et al. ....... 707/999.005 |
| 6,105,133 A | | 8/2000 | Fielder et al. |
| 6,226,742 B1 | | 5/2001 | Jakubowski et al. |
| 6,490,720 B1 | | 12/2002 | Carlsen et al. |
| 6,651,048 B1 | * | 11/2003 | Agrawal et al. ....... 707/999.002 |
| 2002/0129260 A1 | | 9/2002 | Benfield et al. |
| 2002/0186839 A1 | | 12/2002 | Parker et al. |

FOREIGN PATENT DOCUMENTS

JP          11212455 A      8/1999

OTHER PUBLICATIONS

Towards Traceability across Sovereign, Distributed RFID Databases Rakesh Agrawal; Alvin Cheung; Karin Kailing; Stefan Schonauer; Database Engineering and Applications Symposium, 2006. IDEAS '06. 10th International Publication Year: 2006, pp. 174-184.*

(Continued)

*Primary Examiner*—David Y Jung
(74) *Attorney, Agent, or Firm*—Jon A. Gibbons; Fleit Gibbons Gutman Bongini & Bianco PL

(57) ABSTRACT

A system, method, and computer program product to automatically eliminate the distribution information available for reconstruction from a disguised dataset. The invention flattens input numerical values into a substantially uniformly distributed dataset, then maps the uniformly distributed dataset into equivalent data in a target distribution. The invention allows the incremental encryption of new values in an encrypted database while leaving existing encrypted values unchanged. The flattening comprises (1) partitioning, (2) mapping, and (3) saving auxiliary information about the data processing, which is encrypted and not updated. The partitioning is MDL based, and includes a growth phase for dividing a space into fine partitions and a prune phase for merging some partitions together.

19 Claims, 7 Drawing Sheets

OTHER PUBLICATIONS

Rights protection for categorical data Sion, R.; Atallah, M.; Prabhakar, S.; Knowledge and Data Engineering, IEEE Transactions on vol. 17, Issue 7, Jul. 2005 pp. 912-926.*

Rights protection for discrete numeric streams Sion, R.; Atallah, M.; Prabhaka, S.; Knowledge and Data Engineering, IEEE Transactions on vol. 18, Issue 5, May 2006 pp. 699-714.*

A survey of data protection technologies Chung-Yen Chang; Electro Information Technology, 2005 IEEE International Conference on May 22-25, 2005 p. 6.*

R. Agrawal, J. Kiernan, R. Srikant, and Y. Xu. Hippocratic databases. In Proc. of the 28th Int'l Conference on Very Large Databases, Hong Kong, China, Aug. 2002.

N. Ahituv, Y. Lapid, and S. Neumann. Processing encrypted data. Communications of the ACM, 30(9):777-780, 1987.

G. Bebek. Anti-tamper database research: Inference control techniques. Technical Report EECS 433 Final Report, Case Western Reserve University, Nov. 2002.

L. Bouganimand, P. Pucheral. Chip-secured data access: Confidential data on untrusted servers. In Proc. of the VLDB Conference, p. 131-142, Hong Kong, China, Aug. 2002.

C. Boyens and O. Gunther. Trust is not enough: Privacy and security in ASP and web service environments. In 6th East-European Conference on Advances in Databases and Information Systems, Bratislava, Slovakia, Sep. 2002.

Z. J. Czech, G. Havas, and B. S. Majewski. An optimal algorithm for generating minimal perfect hash functions. Information Processing Letters, 43(5):257-264, 1992.

E. Damiani, S. D. C. di Vimercati, S. Jajodia, S. Paraboschi, and P. Samarati. Balancing confidentiality and efficiency in untrusted relational DBMSs. In Proc. of the 10th ACM Conf. on Computer and Communications Security (CCS), Oct. 2003.

D. Denning. Cryptography and Data Security. Addison-Wesley, 1982.

J. Domingo-Ferrer and J. Herrera-Joancomarti. A privacy homomorphism allowing field operations on encrypted data, 1998.

J. Domingo i Ferror. A new privacy homomorphism and applications. Information Processing Letters, 60(5):277-282, 1996.

J. Feigenbaum, M. Y. Liberman, and R. N. Wright. Cryptographic protection of databases and software. In Proc. of the DIMACS Workshop on Distributed Computing and Cryptography, 1990.

E. A. Fox, Q. F. Chen, A. M. Daoud, and L. S. Heath. Order preserving minimal perfect hash functions and information retrieval. ACM Transactions on Information Systems (TOIS), 9:281-308, 1991.

S. C. Gultekin Ozsoyoglu, David Singer. Anti-tamper databases: Querying encrypted databases. In Proc. of the 17th Annual IFIP WG 11.3 Working Conference on Database and Applications Security, Estes Park, Colorado, Aug. 2003.

H. Hacigumus, B. R. Iyer, C. Li, and S. Mehrotra. Executing SQL over encrypted data in the database-service-provider model. In Proc. of the ACM SIGMOD Conf. on Management of Data, Madison, Wisconsin, Jun. 2002.

H. Hacigumus, B. R. Iyer, and S. Mehrotra. Providing database as a service. In Proc. of the Int'l Conf. on Data Engineering, San Jose, California, Mar. 2002.

T. Hamilton. Error sends bank files to eBay. The Toronto Star, Sep. 15, 2003.

Y. E. Ioannidis. The history of histograms (abridged). In Proc. of 29th Int'l Conf. on Very Large Data Bases (VLDB), Berlin, Germany, Sep. 2003.

A. Konig and G. Weikum. Combining histograms and parametric curve fitting for feedback-driven query result-size estimation. In Proc. of the 25th Int'l Conference on Very Large Databases (VLDB '99), 1999.

M. Mehta, R. Agrawal, and J. Rissanen. SLIQ: A fast scalable classifier for data mining. In Proc. of the Fifth Int'l Conference on Extending Database Technology (EDBT), Avignon, France, Mar. 1996.

T. M. Mitchell. Machine Learning, chapter 6. McGraw-Hill, 1997.

Oracle Corporation. Database Encryption in Oracle 8i, Aug. 2000.

W. H. Press, S. A. Teukolsky, W. T. Vetterling, and B. P. Flannery. Numerical Recipes in C: The Art of Scientific Computing. Cambridge University Press, second edition, 1992.

J. Rissanen. Stochastic Complexity in Statistical Inquiry. World Scientific Publ. Co., 1989.

R. L. Rivest, L. Adelman, and M. L. Dertouzos. On data banks and privacy homomorphisms. In Foundations of Secure Computation, p. 169-178, 1978.

California's Senate Bill 1386 http://info.sen.ca.gov/pub/01-02/bill/sen/sb1351-1400/sb1386bill20020926chaptered.html.

D. R. Stinson. Cryptography: Theory and Practice. CRC Press, 2nd edition, 2002.

R. Vingralek. Gnatdb: A small-footprint, secure database system. In Proc. of the VLDB Conference, p. 884-893, Hong Kong, China, Aug. 2002.

National Institute of Standards and Technology, U.S. Department of Commerce. Digital Signature Standard, May 1994.

R. Rivest. The MD5 message digest algorithm. RFC 1320, Apr. 1992.

[27] D. X. Song, D. Wagner, and A. Perrig. Practical techniques for searches on encrypted data. In IEEE Symp. on Security and Privacy, Oakland, California, 2000.

Schneier. Applied Cryptography. John Wiley, second edition, 1996.

Kazuo Ohta, "A Secure and Efficient Broadcast Technique for Encrypted Communication", NTT Review US, vol. 2, No. 2, Mar. 1990, pp. 107-115.

Kazuo Ohta, "A Secure and Efficient Broadcast Technique for Encrypted Communication", NTT Review JP, vol. 39, No. 2, 1990. pp. 765-774.

Edward Sciore et al., "Using Semantic Values to Facilitate Interoperability Among Heterogeneous Information Systems", ACM Transactions on Database Systems, vol.19, No. 2, Jun. 1994, pp. 254-290.

* cited by examiner

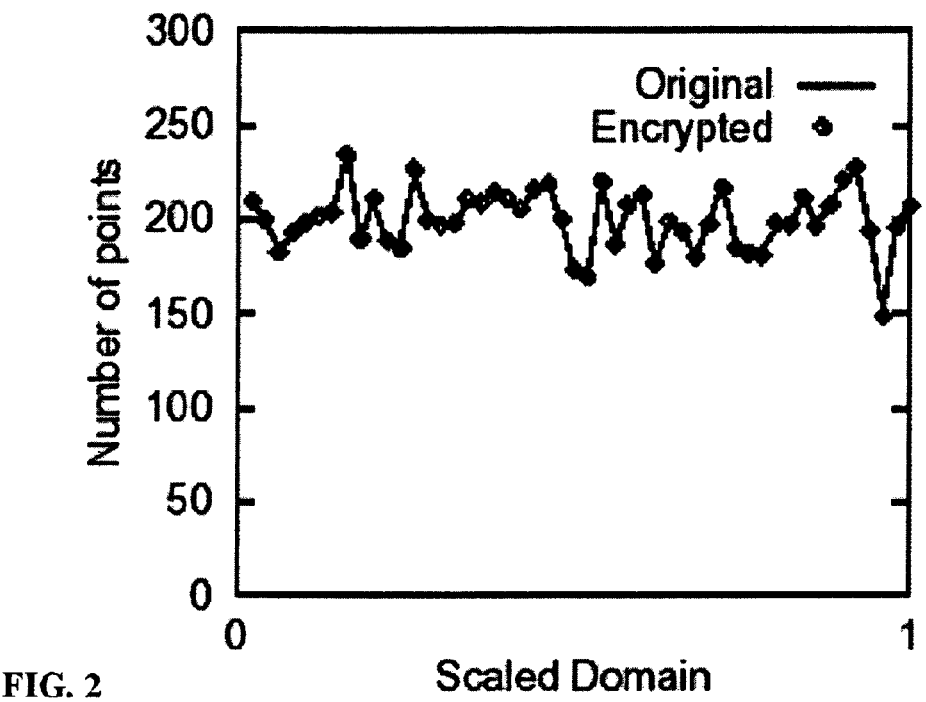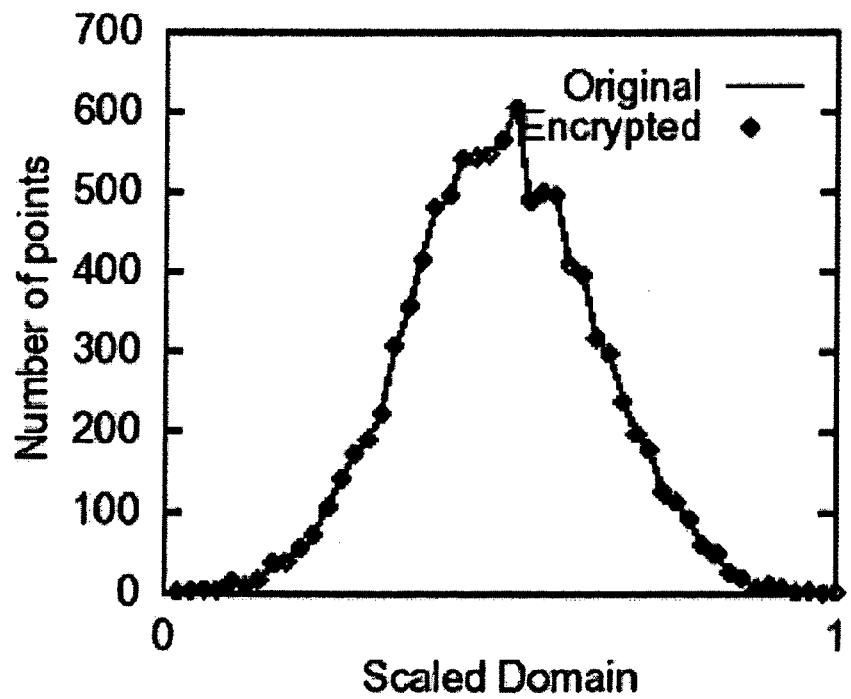
FIG. 2

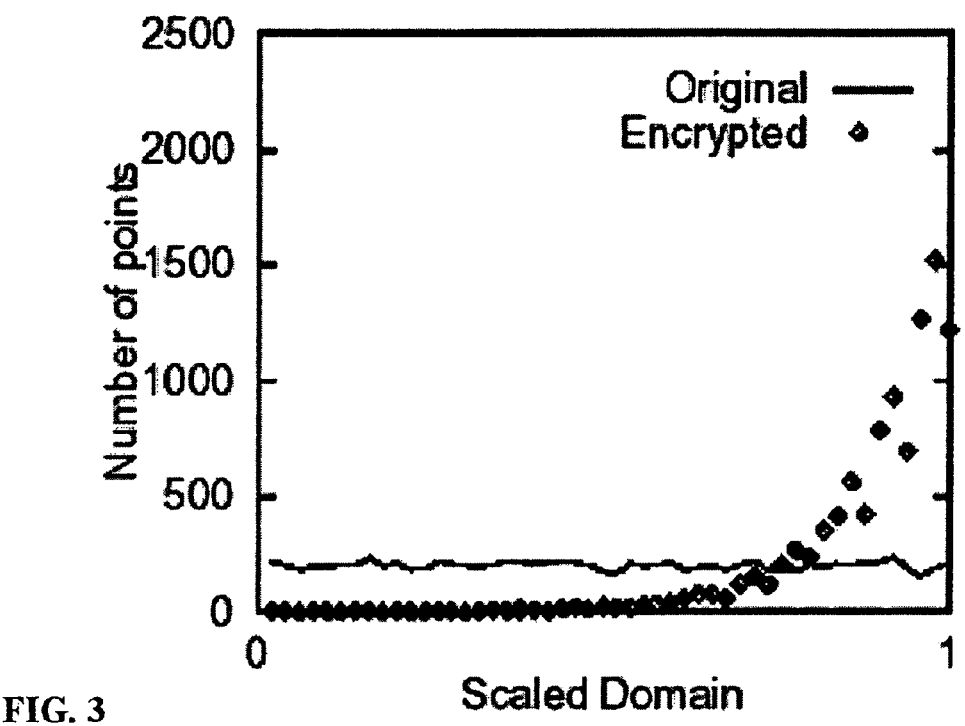
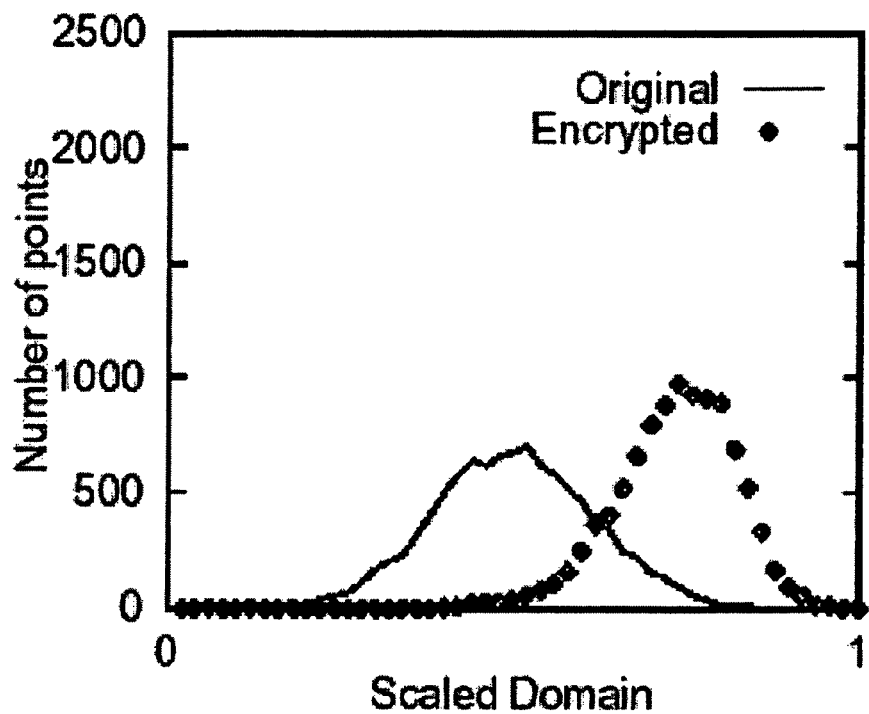
FIG. 3

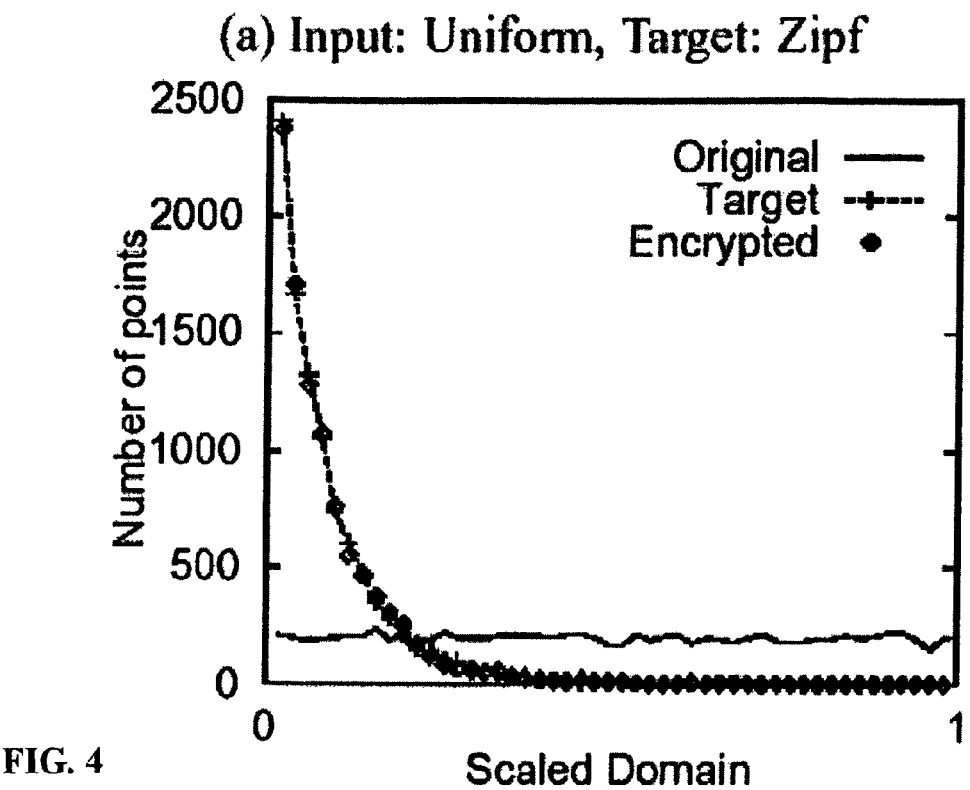
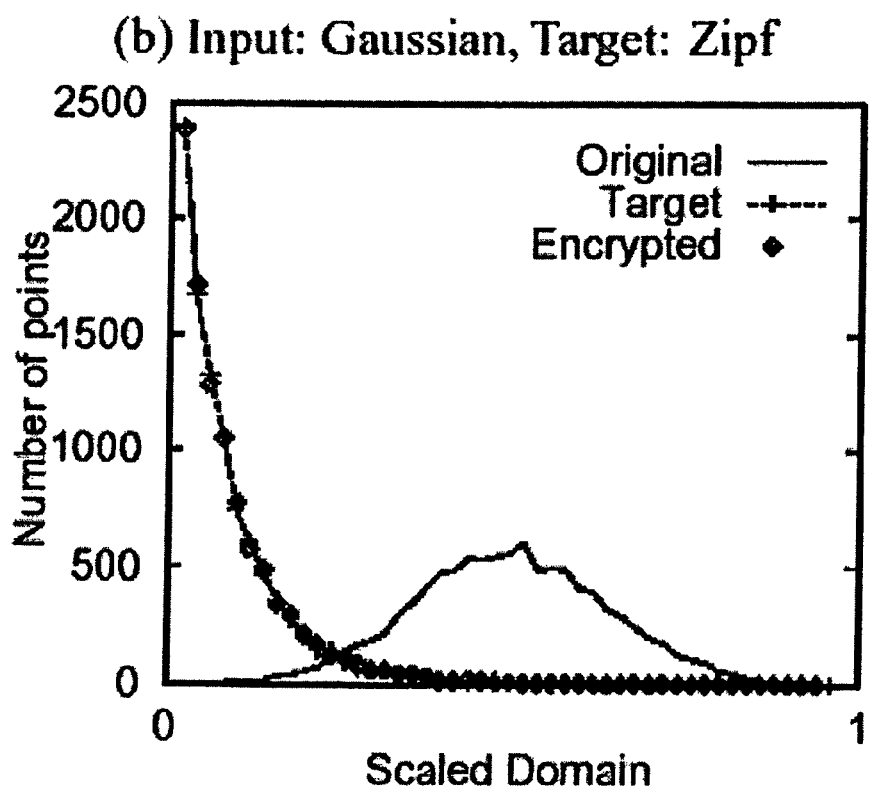
FIG. 4

COMPUTE THE BUCKETS USED TO TRANSFORM THE PLAINTEXT DISTRIBUTION B INTO THE FLATTENED DISTRIBUTION

COMPUTE THE BUCKETS FOR THE FLATTENED DISTRIBUTION $\hat{B}^f$ FROM THE TARGET DISTRIBUTION $B^t$

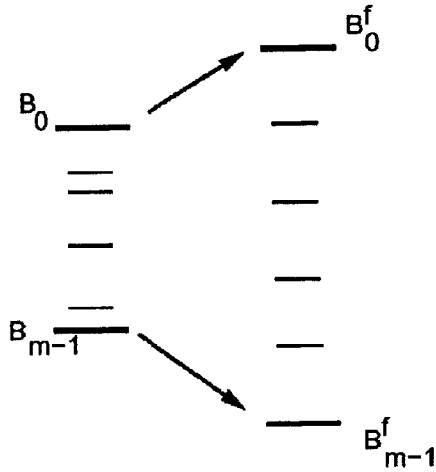
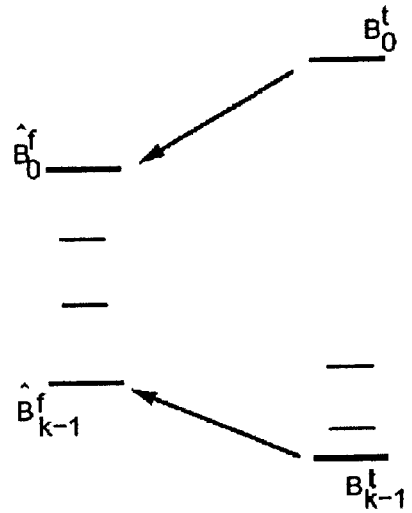

SCALE THE BUCKETS OF FLATTENED DISTRIBUTION $\hat{B}^f$ TO EQUAL THE RANGE OF FLATTENED DISTRIBUTION $B^f$, AND SCALE THE TARGET DISTRIBUTION $B^t$ PROPORTIONATELY.

FIG. 5

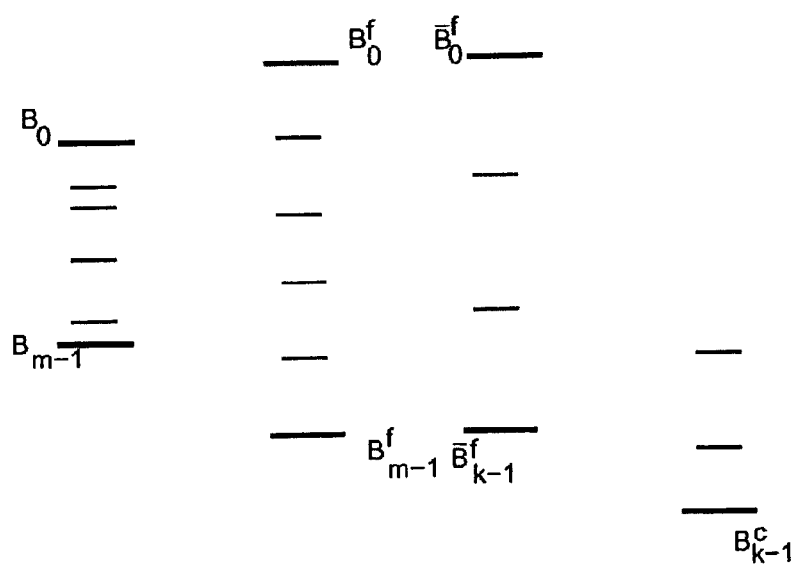

FIG. 6

| Input distribution | Target distribution | Change in Percentile |
|---|---|---|
| Census | Gaussian | 37 |
| Census | Zipf | 7 |
| Census | Uniform | 38 |
| Gaussian | Zipf | 45 |
| Gaussian | Uniform | 17 |
| Zipf | Uniform | 44 |

FIG. 7

| Plaintext | Ciphertext | Overhead |
|---|---|---|
| 7.2 | 7.3 | 1% |

FIG. 8

|  | Plaintext | Ciphertext | Overhead |
|---|---|---|---|
| Equality | 2.9 | 3.0 | 3% |
| 0.1% Selectivity | 7.8 | 9.6 | 23% |
| 1% Selectivity | 48.8 | 68.7 | 41% |
| All records | 4,607.0 | 6,540.0 | 41% |

SYSTEM AND METHOD FOR ORDER-PRESERVING ENCRYPTION FOR NUMERIC DATA

CROSS-REFERENCE TO RELATED APPLICATIONS

This application related to a commonly-owned and currently pending application entitled "System and Method for Fast Querying of Encrypted Databases", U.S. Ser. No. 10/752,154, filed on Jan. 5, 2004, now U.S. Pat. No. 7,426,752 which is hereby incorporated by reference in its entirety.

FIELD OF THE INVENTION

This invention relates to mapping one set of numbers to another to eliminate the distribution information available for reconstruction from a disguised dataset. Specifically, the invention maps numbers from an input source into a uniformly distributed set of numbers, then maps the uniformly distributed set of numbers into equivalent numbers in a target distribution. In an exemplary usage scenario, the input data has been encrypted in an order-preserving manner to enable direct comparison operations.

BACKGROUND OF THE INVENTION

Encryption is a well established technique for protecting sensitive data, such as confidential and personal financial or medical information, that may be stored in database systems. The data is often encrypted to prevent access by unauthorized persons or an untrusted system administrator, or to increase security of client/server type systems. See for example U.S. Pat. No. 6,148,342 and U.S. Patent Application Publications 2002/0104002A1 and 2002/0129260A1. However, once encrypted, the data can no longer be easily queried (aside from exact matches).

In their classic paper [24], Rivest, Adleman, and Dertouzos point out that the limit on manipulating encrypted data arises from the choice of encryption functions used, and there exist encryption functions that permit encrypted data to be operated on directly for many sets of interesting operations. They call these special encryption functions "privacy homomorphisms". The focus of [24] and the subsequent follow-up work [2, 5, 9, 10] has been on designing privacy homomorphisms to enable arithmetic operations on encrypted data. Comparison operations were excluded from this line of research, though; it was observed in [24] that there is no secure privacy homomorphism if both comparison operations and arithmetic operations were included.

Note, cryptography purists may object to this use of the term "encrypted"; they may define the term to mean that absolutely no information about the original data can be derived without decryption. In this application, the term "encrypted" generally refers to the results of mathematical efforts to balance the confidentiality of data while allowing some computations on that data without first requiring decryption (which is typically a computationally expensive alternative). The data is perhaps "cloaked" or "disguised" more than "encrypted" would imply in a strict cryptographic sense.

Hacigumus et al. proposed a clever idea in [14] to index encrypted data in the context of a service-provider model for managing data. Tuples are stored encrypted on the server, which is assumed to be untrusted. For every attribute of a tuple, a bucket id is also stored that represents the partition to which the unencrypted value belongs. This bucket id is used for indexing. Before issuing a selection query to the server, the client transforms the query, using bucket ids in place of query constants. The result of the query is generally the superset of the answer, which is filtered by the client after decrypting the tuples returned by the server. Projection requires fetching complete tuples and then selecting the columns of interest in the client. Aggregation also requires decrypting the values in the client before applying the aggregation operation.

Feigenbaum et al. propose a simple but effective scheme in [11] to encrypt a look-up directory consisting of (key, value) pairs. The goal is to allow the corresponding value to be retrieved if and only if a valid key is provided. The essential idea is to encrypt the tuples as in [14], but associate with every tuple the one-way hash value of its key. Thus, no tuple will be retrieved if an invalid key is presented. Answering range queries was not a goal of this system.

In [27], Song et al. propose novel schemes to support key word searches over an encrypted text repository. The driving application for this work is the efficient retrieval of encrypted email messages. They do not discuss relational queries and it is not clear how their techniques can be adapted for relational databases.

In [4], Bouganim et al. use a smart card with encryption and query processing capabilities to ensure the authorized and secure retrieval of encrypted data stored on untrusted servers. Encryption keys are maintained on the smart card. The smart card can translate exact match queries into equivalent queries over encrypted data. However, the range queries require creating a disjunction for every possible value in the range, which is infeasible for data types such as strings and reals. The smart card implementation could benefit from an encryption scheme wherein range queries could be translated into equivalent queries over encrypted data.

In [29], Vingralek explores the security and tamper resistance of a database stored on a smart card. The author considers snooping attacks for secrecy, and spoofing, splicing, and replay attacks for tamper resistance. Retrieval performance is not the focus of this work and it is not clear how much of the techniques apply to general purpose databases not stored in specialized devices.

Among commercial database products, Oracle 8i allows values in any of the columns of a table to be encrypted [21]. However, the encrypted column can no longer participate in indexing as the encryption is not order-preserving.

Related work also includes research on order-preserving hashing [6, 12]. However, protecting the hash values from cryptanalysis is not the concern of this body of work. Similarly, the construction of original values from the hash values is not required. One-way functions [30, 31] ensure that the original values cannot be recovered from the hash values.

A scheme for performing comparison operations directly on encrypted data without first performing a decryption of the data is therefore needed, and is provided by the invention described in the related application. That invention partitions plaintext data (e.g. column values) into a number of segments, then encrypts each plaintext into ciphertexts in an order-preserving segmented manner. Comparison queries are then performed on the numerical values of the ciphertexts, and the query results are decrypted.

The present invention eliminates the distribution information available for encrypted data, thus strengthening the data protection.

SUMMARY OF THE INVENTION

It is accordingly an object of this invention to provide a system, method, and computer program product for automatically eliminating the distribution information of plaintext values available for an encrypted dataset. The invention flattens input numerical values into another dataset such that the values in the flattened dataset are close to uniformly distributed. Then invention then maps values in the flattened dataset into a target distribution.

It is a further object of the invention to allow the incremental encryption of new values in an encrypted database while leaving existing encrypted values unchanged.

The invention models data distributions using a combination of histogram-based and parametric techniques. Data values are partitioned into buckets and then the distribution within each bucket is modeled as a linear spline. The width of value ranges is allowed to vary across buckets. The MDL principle determines the number of buckets. Bucket boundaries are determined in two phases, a growth phase in which the space is recursively split into finer partitions, and a prune phase in which some buckets are merged into bigger buckets. In the growth phase, buckets are split at the points that have the largest deviation from expected values. Splitting stops when the number of points in a bucket is below a threshold value.

The flattening stage of the invention maps a plaintext bucket into a bucket in the flattened space such that the length of the flattened bucket is proportional to the number of values in the plaintext bucket. A different scaling factor is used for each bucket, such that two distinct values in the plaintext will always map to two distinct values in the flattened space to ensure incremental updatability, and each bucket is mapped to a space proportional to the number of points in that bucket. Special buckets are created to cover stray values beyond the current range of data values. The inverse of the mapping function is used to map flattened values into plaintext values in a manner similar to the initial mapping into flattened values.

The foregoing objects are believed to be satisfied by the embodiments of the present invention as described below.

BRIEF DESCRIPTION OF THE DRAWINGS

FIG. 2 is a diagram of the distribution of encrypted values versus the input distribution using a naïve approach based upon the summation of random numbers.

FIG. 3 is a diagram depicting how with polynomial functions the encryption of different input distributions looks different.

FIG. 4 is a diagram illustrating the distribution of encrypted values using the order-preserving encryption scheme of the invention.

FIG. 5 is a diagram illustrating the partitioning and scaling of the intermediate and target distributions.

FIG. 6 is a table showing the average change between the original percentile and the percentile in the encrypted distribution.

FIG. 7 is a table showing the time (in seconds) required to insert 1000 tuples.

FIG. 8 is a table showing the time (in milliseconds) for executing predicates over 1 million tuples.

DETAILED DESCRIPTION OF THE INVENTION

1. Introduction

Figure 1:
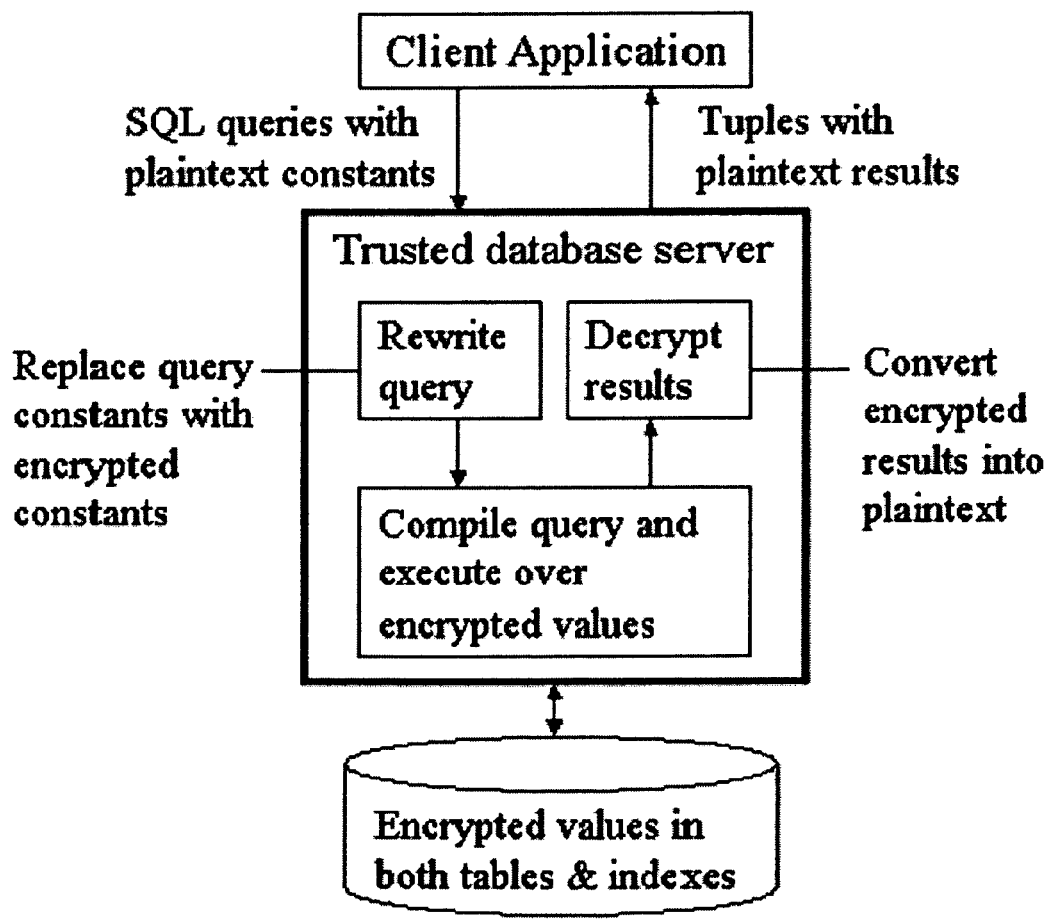
FIG. 1 is a diagram of the architecture for transparent encryption with a trusted database system with vulnerable storage.

With the dramatic increase in the amount of data being collected and stored in databases, it has become vital to develop effective techniques for protecting sensitive data from misuse. Database systems typically offer access control as the means to restrict access to sensitive data. This mechanism protects the privacy of sensitive information provided data is accessed using the intended database system interfaces. However, access control, while important and necessary, is often insufficient. Attacks upon computer systems have shown that information can be compromised if an unauthorized user simply gains access to the raw database files, bypassing the database access control mechanism altogether. For instance, a recent article published in the Toronto Star [16] describes an incident where a disk containing the records of several hundred bank customers was being auctioned on eBay. The bank had inadvertently sold the disk to the eBay re-seller as used equipment without deleting its contents. Similarly, a security breach in April 2002 left a payroll database containing the personal records of 265,000 California state employees exposed for over a month. This breach provided the impetus for the recent California legislation SB 1386 [25], which requires any institution doing business in California that maintain databases of personal information to notify every affected individual if the institution uncovers a security breach. A draft legislation currently circulating in the U.S. Senate, known as the Database Security Breach Notification Act, is modeled on SB 1386 and would extend its reporting requirements throughout United States. Drawing upon privacy legislations and guidelines worldwide, the designers of Hippocratic databases have also identified the protection of personal data from unauthorized acquisition as a vital requirement [1].

Encryption is a well established technology for protecting sensitive data [8, 26, 28]. Unfortunately, the integration of existing encryption techniques with database systems introduces undesirable performance limitations in the management of encrypted data. For example, if a column of a table containing sensitive information is encrypted, and is used in a query predicate with a comparison operator, an entire table scan would be needed to evaluate the query. The reason is that the current encryption techniques do not preserve order and therefore database indices such as B-trees can no longer be used. Thus query execution over encrypted databases can become unacceptably slow.

In a related patent application (U.S. Ser. No. 10/752,121, entitled "System and Method for Fast Querying of Encrypted Databases"), we proposed a new order preserving encryption scheme that allows queries with comparison operators to be directly applied to encrypted numeric columns. Query results neither contain any false positives nor miss any answer tuple. New values can be added without triggering changes in the encryption of other values. The scheme is designed to operate in environments in which the intruder can get access to the encrypted database, but does not have prior information such as the distribution of values and cannot encrypt or decrypt arbitrary values of his choice. In such environments, the scheme is robust against an adversary being able to obtain a tight estimate of an encrypted value. The measurements from a DB2 implementation shows that the performance overhead of the scheme on query processing is small, so it is reasonable for it to be deployed in production environments.

The encryption scheme allows comparison operations to be directly applied on encrypted data, without decrypting the operands. Thus, equality and range queries as well as the MAX, MIN, and COUNT queries can be directly processed over encrypted data. Similarly, GROUPBY and ORDERBY operations can also be applied. Only when applying SUM or AVG to a group do the values need to be decrypted. The encryption scheme is also endowed with the following essential properties:

- The results of query processing over data encrypted using the scheme are exact. They neither contain any false positives nor miss any answer tuple. This feature of the scheme sharply differentiates it from schemes such as [14] that produce a superset of the answer, necessitating filtering of extraneous tuples in a rather expensive and complex post-processing step.
- The scheme handles updates gracefully. A value in a column can be modified or a new value can be inserted in a column without requiring changes in the encryption of other values.
- The scheme can be integrated with existing database systems with very little effort as it has been designed to work with the existing indexing structures, such as B-trees. The fact that the database is encrypted can be made transparent to the applications.
- Measurements from an implementation of the scheme in DB2 show that the time and space overhead are reasonable for it to be deployed in real systems.

However, the scheme described in the related application does not provide a numerical measure of how well the data distribution is hidden.

1.1 Estimation Exposure

Encryption technology was initially devised primarily for secure communication of text messages. The security of an encryption scheme is conventionally assessed by analyzing whether an adversary can find the key used for encryption. See [26, 28] for a categorization of different levels of attacks against a cryptosystem.

However, the bigger threat that an order-preserving encryption system must guard against is estimation exposure. When dealing with sensitive numeric data, an adversary does not have to determine the exact data value p corresponding to an encrypted value c; a breach may occur if the adversary succeeds in obtaining a tight estimate of p. For a numeric domain P, if an adversary can estimate with c % confidence that a data value p lies within the interval $[p_1, p_2]$ then the interval width $(p_2-p_1)/|P|$ defines the amount of estimation exposure at c % confidence level.

Clearly, any order-preserving encryption scheme is vulnerable to tight estimation exposure if the adversary can choose any number of unencrypted (encrypted) values of his liking and encrypt (decrypt) them into their corresponding encrypted (plaintext) values. Similarly, any order-preserving encryption is not secure against tight estimation exposure if the adversary can guess the domain and knows the distribution of values in that domain.

We consider an application environment where the goal is safety from an adversary who has access to all (but only) encrypted values (the so called ciphertext only attack [26, 28]), and does not have any special information about the domain. We will particularly focus on robustness against estimation exposure.

1.2 Application Environment

Our threat model assumes (see FIG. 1):

- The storage system used by the database software is vulnerable to compromise. While current database systems typically perform their own storage management, the storage system remains part of the operating system. Attacks against storage could be performed by accessing database files following a path other than through the database software, or in the extreme, by physical removal of the storage media.
- The database software is trusted. The modern database software is the result of years of development work and fine tuning, and in addition, the database vendors have a high degree of accountability to their clients. Some database software has been subjected to security evaluations by external agencies. We trust the database software to transform query constants into their encrypted values and decrypt the query results. Similarly, we assume that an adversary does not have access to the values in the memory of the database software.
- All disk-resident data is encrypted. In addition to the data values, the database software also encrypts schema information such as table and column names, metadata such as column statistics, as well as values written to recovery logs. Otherwise, an adversary may be able to use this information to guess data distributions.

This threat model is applicable in many application environments, including database installations wanting to comply with California SB 1386 [25] as well as enterprise applications of Hippocratic databases [1].

The application environment we consider is different from the one considered in [5] [15] for managing databases as a service. The service provider model assumes that the database software is untrusted, but allows for considerable post-processing in the client. We trust the database software, but the encryption is transparent to the client applications. One can see, however, that our techniques can be adapted for use in the service provider model also.

1.3 Pedagogical Assumptions and Notations

The focus of this application is on developing order-preserving encryption techniques for numeric values. We assume conventional encryption [26, 28] for other data types as well as for encrypting other information such as schema names and metadata. We will sometimes refer to unencrypted data values as plaintext. Similarly, encrypted values will also be referred to as ciphertext.

We will assume that the database consists of a single table, which in turn consists of a single column. The domain of the column is a subset of integer values $[p_{min}, p_{max})$. The extensions for real values will be given below.

Let the database $\tilde{P}$ consist of a total of $|\tilde{P}|$ plaintext values. Out of these, $|P|$ values are unique, which will be represented as $P=p_1, p_2, \ldots, p_{|P|}$, where $p_i<p_{i+1}$. The corresponding encrypted values will be represented as $C=c_1, c_2, \ldots, c_{|P|}$, where $c_i<c_{i+1}$.

Duplicates can sometimes be used to guess the distribution of a domain, particularly if the distribution is highly skewed. A closely related problem is that if the number of distinct values is small (e.g., day of the month), it is easy to guess the domain. We will initially assume that the domain to be encrypted either does not contain many duplicates or contains a distribution that can withstand a duplicate attack and discuss extensions to handle duplicates later.

2. Related Work

Summation of Random Numbers

In [3], the authors suggest a simple scheme in which the encrypted value c of integer p is computed as $$c = \sum_{j=0}^{p} Rj$$

where Rj is the jth value generated by a secure pseudo-random number generator. Unfortunately, the cost for encrypting or decrypting c can be prohibitive for large values of p.

An even more serious problem is the vulnerability of this scheme to estimation exposure. Since the expected gap between two encrypted values is proportional to the gap between the corresponding plaintext values, the nature of the plaintext distribution can be inferred from the encrypted values. FIG. 2 shows the distributions of encrypted values obtained using this scheme for data values sampled from two different distributions: uniform and gaussian. In each case, once both the input and encrypted distributions are scaled to be between 0 and 1, the number of points in each bucket is almost identical for the plaintext and encrypted distributions. Thus the percentile of a point in the encrypted distribution is also identical to its percentile in the plaintext distribution.

Polynomial Functions

In [13], a sequence of strictly increasing polynomial functions is used for encrypting integer values while preserving their orders. These polynomial functions can simply be of the first or second order, with coefficients generated from the encryption key. An integer value is encrypted by applying the functions in such a way that the output of a function becomes the input of the next function. Correspondingly, an encrypted value is decrypted by solving these functions in reverse order. However, this encryption method does not take the input distribution into account. Therefore the shape of the distribution of encrypted values depends on the shape of the input distribution, as illustrated in FIG. 3 for the encryption function from Example 10 in [13]. This suggests that this scheme may reveal information about the input distribution, which can be exploited.

Bucketing

In [14], the tuples are encrypted using conventional encryption, but an additional bucket id is created for each attribute value. This bucket id, which represents the partition to which the unencrypted value belongs, can be indexed. The constants in a query are replaced by their corresponding bucket ids. Clearly, the result of a query will contain false hits that must be removed in a post-processing step after decrypting the tuples returned by the query. This filtering can be quite complex since the bucket ids may have been used in joins, subqueries, etc. The number of false hits depends on the width of the partitions involved. It is shown in [14] that the post-processing overhead can become excessive if a coarse partitioning is used for bucketization. On the other hand, a fine partitioning makes the scheme potentially vulnerable to estimation exposure, particularly if equi-width partitioning is used.

It has been pointed out in [7] that the indexes proposed in [14] can open the door to interference and linking attacks in the context of a service-provider model. Instead, they build usual B-tree over plaintext values, but then encrypt every tuple and the B-tree at the node level using conventional encryption. The advantage of this approach is that the content of B-tree is not visible to an untrusted database server. The disadvantage is that the B-tree traversal can now only be performed by the front-end by executing a sequence of queries that retrieve tree nodes at progressively deeper level.

3. Strengthening the Order-preserving Encryption Scheme

The basic idea of this invention is to take as input a user-provided target distribution and transform the plaintext values in such a way that the transformation preserves the order while the transformed values follow the target distribution. FIG. 4 shows the result of running the invention with different combinations of input and target distributions. Notice that the distribution of encrypted values looks identical in both 4(a) and 4(b), even though the input distributions were very different.

3.1 Intuition

To understand the intuition behind the invention, consider the following encryption scheme:

Generate |P| unique values from a user-specified target distribution and sort them into a table T. The encrypted value $c_i$ of $p_i$ is then given by $c_i=T[i]$. That is, the $i^{th}$ plaintext value in the sorted list of |P| plaintext values is encrypted into the $i^{th}$ value in the sorted list of |P| values obtained from the target distribution. The decryption of c requires a lookup into a reverse map. Here T is the encryption key that must be kept secret.

Clearly, this scheme does not reveal any information about the original values apart from the order, since the encrypted values were generated solely from the user-specified target distribution, without using any information from the original distribution. Even if an adversary has all of the encrypted values, he cannot infer T from those values. By appropriately choosing target distribution, the adversary can be forced to make large estimation errors.

This simple scheme, while instructive, has the following shortcomings for it to be used for encrypting large databases:

The size of encryption key is twice as large as the number of unique values in the database.

Updates are problematic. When adding a new value p, where $p_i<p<p_{i+1}$, we will need to re-encrypt all $p_j$, $j>i$.

(Note, it is possible to avoid immediate re-encryption by choosing an encrypted value for p in the interval $(c_i, c_{i+1})$, but T would still need updating. Moreover, there might be cases where $c_{i+1}=c_i+1$ and therefore inserting a new value will require re-encryption of existing values. Note also that the encryption scheme $c_i=T[p_i]$ circumvents the update problem. But now the size of the key becomes the size of the domain, which is simply infeasible for real values. It is also vulnerable to percentile exposure, as discussed earlier in Section 2.)

This invention has been designed such that the result of encryption is statistically indistinguishable from the one obtained using the above scheme, thereby providing the same level of security, while removing its shortcomings.

3.2 Overview of the Invention

When encrypting a given database P, the invention makes use of all the plaintext values currently present, P, and also uses a database of sampled values from the target distribution. (Note, if an installation is creating a new database, the database administrator can provide a sample of expected values.) Only the encrypted database C is stored on disk. At this time, the invention also creates some auxiliary information K, which the database system uses to decrypt encoded values or encrypt new values. Thus K serves the function of the encryption key. This auxiliary information is kept encrypted using conventional encryption techniques.

The invention works in three stages:

1. Model: The input and target distributions are modeled as piece-wise linear splines.

2. Flatten: The plaintext database P is transformed into a "flat" database F such that the values in F are uniformly distributed.

3. Transform: The flat database F is transformed into the cipher database C such that the values in C are distributed according to the target distribution.

Note that $$p_i<p_j \vee f_i<f_j \vee c_i<c_j.$$

We give details of the three stages in Sections 4, 5 and 6 respectively.

4. Modeling the Distributions

The techniques for modeling data distributions have been studied extensively in the database literature in the context of estimating the costs of different query execution plans. Borrowing from [18], we have two broad categories of techniques available to us: histogram based techniques that capture statistical information about a distribution by means of counters for a specified number of buckets, and parametric techniques that approximate a distribution by fitting the parameters of a given type of function. We experimented with several histogram-based techniques [17], including equi-depth, equi-width, and wavelet-based methods, but found that the flattened values obtained were not uniformly distributed unless the number of buckets was selected to be unreasonably large. The main source of the problem was the assumption that the distribution is uniform within each bucket. The parametric techniques are suitable for closed-form distributions, but they lead to poor estimations for irregular distributions [18], which we expect to be the norm in our application.

We therefore resorted to a combination of histogram-based and parametric techniques to model distributions. As in [18], we first partition the data values into buckets, and then model the distribution within each bucket as a linear spline. The spline for a bucket $[p_l, P_h)$ is simply the line connecting the densities at the two endpoints of the bucket. (Note, in [18], the splines are not continuous across buckets; they use linear regression over data values present in a bucket for determining the spline. However, such discontinuities may cause undesirable breaks in the uniformity when we flatten plaintext values.)

We also allow the width of value ranges to vary across buckets. However, unlike [18], we do not have a given fixed number of buckets. Rather, we use the minimum description length (MDL) principle [23] to determine the number of buckets.

4.1 Bucket Boundaries

The bucket boundaries are determined in two phases:

(Note, this procedure is reminiscent of the procedure for building decision tree classifiers [20], and in particular SLIQ [19], but the details are quite different.)

1. Growth phase. The space is recursively split into finer partitions. Initial partitions are created by repeatedly splitting the plaintext values. Each partitioning of a bucket reduces the maximum deviation from the density function within the newly formed buckets when compared to their parent bucket.

2. Prune phase. Some buckets are pruned (merged into bigger buckets). The idea is to minimize the number of buckets and yet have the values within buckets after mapping be uniformly distributed. We use the MDL principle to obtain this balance.

The details of these two phases are discussed next.

4.2 Growth Phase

Given a bucket $[p_l, p_h)$, we first find the linear spline for this bucket. Recall that we have h−l−1 (sorted) points in this bucket: $\{p_{l+1}, p_{l+2}, \ldots, p_{h-1}\}$. For each point $p_s$ in this set, we compute its expected value if the points were distributed according to the density distribution modeled by the linear spline (i.e., the expected value of the $(s-1)^{th}$ smallest value in a set of h−l−1 random values drawn from the distribution). We then split the bucket at the point that has the largest deviation from its expected value (breaking ties arbitrarily). We stop splitting when the number of points in a bucket is below some threshold, say, 10.

4.3 Prune Phase

The MDL principle [23] states that the best model for encoding data is the one that minimizes the sum of the cost of describing the model and the cost of describing the data in terms of that model. For a given bucket $[p_l, p_h)$, the local benefit LB of splitting this bucket at a point $p_s$ is given by $$LB(p_l,p_h) = \text{DataCost}(p_l,p_h) - \text{DataCost}(p_l,p_s) - \text{DataCost}(p_s,p_h) - \text{IncrModelCost}$$

where $\text{DataCost}(p_1, p_2)$ gives the cost of describing the data in the interval $[p_1, p_2)$ and IncrModelCost is the increase in modeling cost due to the partitioning of a bucket into two buckets.

The global benefit GB of splitting this bucket at $p_s$ takes into account the benefit of further recursive splits:

$$GB(p_l,p_h) = LB(p_l,p_h) + GB(p_l,p_s) + GB(p_s,p_h).$$

If GB>0, the split is retained; otherwise, the split at $p_s$ and all recursive splits within $[P_l, P_h)$ are pruned. Note that we do this computation bottom up, and therefore the cost is linear in the number of splits. (Note, one might wonder why we did not combine pruning with the growth phase and stop splitting a bucket as soon as the local benefit became zero or negative. The reason is that the benefit of partitioning may start showing only at a finer granularity, and it will often be the case that the local benefit is less than zero even though the global benefit is much greater than zero.)

We now provide the functions for the computation of DataCost and IncrModelCost. Assume momentarily the existence of a mapping M that transforms values sampled from a linear density function into a set of uniformly distributed values. We specify M in the next section. As we shall see, M will have two parameters: a quadratic coefficient and a scale factor.

4.3.1 DataCost

We want to flatten a given data distribution into a uniform distribution. We retain a bucket only if it contributes to this goal. So, given a bucket, we first flatten the values present in the bucket using the mapping M, and then compute the cost of encoding the deviations from uniformity for the mapped values. (Note, our implementation encodes only the statistically significant deviations to avoid overfitting, i.e., rather than a single expected value, we consider the range of values that would occur with a uniform distribution, and only encode values that are outside this range.)

Let the set of data values $\{p_l, p_{l+1}, \ldots, p_{h-1}\}$ be mapped into $\{f_l, f_{l+1}, \ldots, f_{h-1}\}$ using M. The encoding of a value $p_i \chi [p_l, p_h)$ would cost $$\text{Cost}(p_i) = \log|f_i - E(i)|,$$

where E(i), the expected value of the $i^{th}$ number assuming uniformity, is given by $$E(i) = f_l + \frac{i-l}{h-l}(f_h - f_l).$$

The cost of encoding all the values in the interval $[p_l, p_h)$ is given by $$\text{DataCost}(p_l, p_h) = \sum_{i=l+1}^{h-1} \text{Cost}(p_i)$$

4.3.2 IncrModelCost

If we have m buckets, we need to store m+1 boundaries, m quadratic coefficients, and m scale factors. Thus the model cost will be $(3m+1) \times 32$, assuming 32 bits for each of these values. More importantly, the cost of an additional bucket is $$\text{IncrModelCost} = 32 \times 3 = 96.$$

5. Flatten

The overall idea of the flatten stage is to map a plaintext bucket B into a bucket $B^f$ in the flattened space in such a way that the length of $B^f$ is proportional to the number of values present in B. Thus, the dense plaintext buckets will be stretched and the sparse buckets will be compressed. The values within a bucket are mapped in such a way that the density will be uniform in the flattened bucket. Since the densities are uniform both inter-bucket and intra-bucket, the values in the flattened database will be uniformly distributed. We specify next a mapping function that accomplishes these goals.

5.1 Mapping Function

Observation 1: If a distribution over $[0, p_h)$ has the density function $qp+r$, where $p \chi [0, p_h)$, then for any constant $z>0$, the mapping function $$M(p) = z\left(\frac{q}{2r}p^2 + p\right)$$

will yield a uniformly distributed set of values.

This follows from the fact that the slope of the mapping function at any point p is proportional to the density at p:

$$\frac{dM}{dp} = \frac{z}{r}(qp+r),$$

$$\propto qp+r.$$

An equivalent way to think about this is that the space around p, say from p−1 to p+1 is mapped to a length of $$M(p+1) - M(p-1) = \frac{2z}{r}(qp+r), \propto qp+r.$$

We will refer to $s := q/2r$ as the quadratic coefficient. Thus $$M(p) = z(sp^2 + p)$$

A different scale factor z is used for different buckets, in order to make the inter-bucket density uniform as well. We describe next how the scale factors are computed.

5.2 Scale Factor

We need to find the scale factor z, one for each bucket B such that:

1. Two distinct values in the plaintext will always map to two distinct values in the flattened space, thereby ensuring incremental updatability.
2. Each bucket is mapped to a space proportional to the number of points n in that bucket, i.e., if w is the width of the bucket and $w^f = M(w)$ is the width after flattening, then $w^f \propto n$.

The first constraint can be written as:

$$\forall p \chi [0, w) : M(p+1) - M(p) \geq 2$$

The 2 in the RHS (instead of 1) ensures two adjacent plaintext values will be at least 2 apart in the flattened space. As we will explain in Section 5.5, this extra separation makes encryption tolerant to rounding errors in floating point calculations. Expanding M, we get $$\forall p \chi [0, w) : z \geq 2/(s(2p+1)+1).$$

The largest value of $2/(s(2p+1)+1)$ will be at p=0 if $s \geq 0$, and at p=w−1 otherwise. Therefore we get $$\hat{z} = 2 \text{ if } s \geq 0, \text{ or}$$

$$\hat{z} = 2/(1+s(2w-1)) \text{ if } s<0$$

Where $\hat{z}$ denotes the minimum value of z that will satisfy the first constraint.

To satisfy the second constraint, we want $w^f = Kn$ for all the buckets. Define $$\hat{w}^f = \hat{z}(sw^2 + w)$$

as the minimum width for each bucket, and define $$K = \max[\hat{w}_i^f], \text{ where } i=1,\ldots,m.$$

Then the scale factors $$z = \frac{Kn}{sw^2 + w}$$

will satisfy both the desired constraints, since $z > \hat{z}$, and $w^f = z(sw^2+w) = Kn$.

5.3 Encryption Key

Let us briefly review what we have at this stage. The modeling phase has yielded a set of buckets $\{B_1, \ldots, B_m\}$. For each bucket, we also have a mapping function M, characterized by two parameters: the quadratic coefficient s and the scale factor z. We save the m+1 bucket boundaries, the m quadratic coefficients, and the m scale factors in a data structure $K^f$. The database system uses $K^f$ to flatten (encrypt) new plaintext values, and also to unflatten (decrypt) a flattened value. Thus $K^f$ serves the function of the encryption key.

Note that $K^f$ is computed once at the time of initial encryption of the database. As the database obtains new values, $K^f$ is used to encrypt them, but it is not updated, which endows OPES with the incremental updatability property. (Note, in order to encrypt stray values outside of the current range $[p_{min}, p_{max})$, we create we create two special buckets, $B_0 = [\text{MINVAL}, p_{min})$ and $B_{m+1} = [p_{max}, \text{MAXVAL}]$, where [MINVAL, MAXVAL] is the domain of the input distribution. Since these buckets initially do not contain any values, we estimate the s and z parameters for them. The quadratic coefficient s for the buckets is set to 0. To estimate the scale factor for $B_0$, we extrapolate the scaling used for the two closest points in $B_1$ into $B_0$ and define $z_0$ to be $(f_2 - f_1)/(p_2 - p_1)$. Similarly, the scale factor for $B_{m+1}$ is estimated using the two closest values in buckets $B_m$. To simplify exposition, the rest of the application ignores the existence of these special buckets.)

5.4 Mapping a Plaintext Value into a Flat Value

Represent the domains of the input database P and the flat database F as $[p_{min}, p_{max})$ and $[f_{min}, f_{max})$ respectively. Note that $$f_{max} = f_{min} + \sum_{i=1}^{m} w_i^f$$

where $w_i^f = M_i(w_i)$. Recall that $w_i$ is the length of plaintext bucket $B_i$, and $w_i^f$ is the length of the corresponding flat bucket.

To flatten a plaintext value p, we first determine the bucket B into which p falls, using the information about the bucket boundaries saved in $K^f$. Now p is mapped into the flat value f using the equation:

$$f = f_{min} + \sum_{j=1}^{i-1} w_j^f + M_i\left(p - p_{min} - \sum_{j=1}^{i-1} w_j\right).$$

5.5 Mapping a Flat Value into a Plaintext Value

We can rewrite the previous equation as $$p = p_{min} + \sum_{j=1}^{i-1} w_j + M_i^{-1}\left(f - f_{min} - \sum_{j=1}^{i-1} w_j^f\right)$$

where $$M_i^{-1}(f) = \frac{-z \pm \sqrt{z^2 + 4zsf}}{2zs}$$

and z and s represent respectively the scale factor and the quadratic coefficient of the mapping function M. So, unflattening requires using the information in $K^f$ to determine the flat bucket $B_i^f$ in which the given flat value f lies and then applying $M^{-1}$. Out of the two possible values for $M^{-1}$, only one will be within the bucket boundary.

Note that M(p), as well as $M^{-1}(f)$ will usually not be integer values, and are rounded to the nearest integer. To remove the possibility of errors due to rounding floating point calculations, we verify whether $M^{-1}(f)=p$ immediately after computing M(p). If it turns out that $M^{-1}(f)$ is actually rounded to p−1, we encrypt p as f+1 instead of f. Since we ensured that two adjacent plaintext values are at least 2 apart in the flattened space when computing the scale factors, $M^{-1}(f+1)$ will decrypt to p and not to p+1. Similarly, if $M^{-1}(f)=p+1$, we encrypt p as f−1.

6. Transform

The transform stage is almost a mirror image of the flatten stage. Given a uniformly distributed set of flattened values, we want to map them into the target distribution. An equivalent way of thinking about the problem is that we want to flatten the target distribution into a uniform distribution, while ensuring that the distribution so obtained "lines-up" with the uniform distribution yielded by flattening the plaintext distribution.

FIG. 5 portrays this process. We already have on hand the buckets for the plain text distribution. We bucketize the target distribution, independent of the bucketization of the plaintext distribution. We then scale the target distribution (and the flattened target distribution) in such a way that the width of the uniform distribution generated by flattening the scaled target distribution becomes equal to the width of the uniform distribution generated by flattening the plaintext distribution.

We will henceforth refer to the scaled target distribution as the cipher distribution.

6.1 Scaling the Target Distribution

The modeling of the target distribution yields a set of buckets $\{B_1^t, \ldots, B_k^t\}$. For every bucket $B^t$ of length $w^t$, we also get the mapping function $M^t$ and the associated parameters $s^t$ and $z^t$. For computing the scale factor $z^t$ for each bucket, we use a procedure similar to the one discussed in Section 5.2, except that the first constraint is flipped. We now need to ensure that two adjacent values in the flat space map to two distinct values in the target space (whereas earlier we had to ensure that two adjacent values in the plaintext space mapped to two distinct values in the flat space).

An analysis similar to Section 5.2 yields $$z^t = \frac{K^t n^t}{s^t(w^t)^2 + w^t}$$

where $$K^t = \min\left[\frac{\hat{z}_i^t(s_i^t(w_i^t)^2 + w_i^t)}{n_i^t}\right], \text{ where } i = 1, \ldots, k$$

and $\hat{z}^t = 0.5/(1+s^t(2w^t-1))$, if $s^t > 0$ or $\hat{z}^t = 0.5$, if $s^t \leq 0$.

(1) Compute the buckets used to transform the plaintext distribution into the flattened distribution.

(2) From the target distribution, compute the buckets for the flattened distribution $\hat{B}^f$.

(3) Scale the buckets of flattened distribution to equal the range of the flattened distribution computed in Step 1, and scale the target distribution proportionately.

Let $\hat{B}^f$ be the bucket in the flat space corresponding to the bucket $B^t$, with length $\hat{w}^f$. We also have buckets $\{B_1^f, \ldots, B_m^f\}$ from flattening the plaintext distribution. As before, let bucket $B^f$ have length $w^f$. We want the range of the two flat distributions to be equal. So we define the matching factor L to be $$L = \left(\sum_{i=1}^{m} w_i^f\right) \bigg/ \left(\sum_{i=1}^{k} \hat{w}_i^f\right).$$

We then scale both the target buckets $B^t$ and the flattened target buckets $\hat{B}^f$ by a factor of L. So the length of the cipher bucket $B^c$ corresponding to the target bucket $B^t$ is given by $w_i^c = L w_i^t$ and the length of the scaled flattened target bucket $\overline{B}^f$ is given by $\overline{w}^f = L\hat{w}^f$.

6.2 Mapping Function

We now specify the function $M^c$ for mapping values from the bucket $B^c$ to the flat bucket $\hat{B}^f$. The quadratic coefficient for $M^c$ is determined as $s^c = s^t/L$, and the scale factor $z^c$ is set to $z^t$, for reasons explained next.

Recall that $s^t := q^t/2r^t$, where $n^t = q^t x + r^t$ is the linear approximation of the density in the bucket $B^t$. When we expand the domain by a factor of L, $q^t/r^t$ is reduced by a factor of L. Therefore $s^c = s^t/L$.

Now $z^c$ should ensure that $M^c(w^c) = \overline{w}^c$. Setting $z^c = z^t$ provides this property since $$M^c(w^c) = z^c(s^c(w^c)^2 + w^c)$$
$$= z^t((s^t/L)(Lw^t)^2 + Lw^t)$$
$$= LM^t(w^t)$$
$$= L\hat{w}^f$$
$$= \overline{w}^f$$

6.3 Mapping Flat Values to Cipher Values

We save the bucket boundaries in the cipher space in the data structure $K^c$. For every bucket, we also save the quadratic coefficient $s^c$ and the scale factor $z^c$.

A flat value f from the bucket $\overline{B}_i^f$ if can now be mapped into a cipher value c using the equation $$c = c_{min} + \sum_{j=1}^{i-1} w_j^c + (M_i^c)^{-1}\left(f - f_{min} - \sum_{j=1}^{i-1} \overline{w}_i^f\right)$$

where $$(M^c)^{-1}(f) = \frac{-z \pm \sqrt{z^2 + 4zsf}}{2zs}$$

Only one of the two possible values will lie within the cipher bucket, and we round the value returned by $(M^c)^{-1}$.

A cipher value c from the bucket B is mapped into a flat value f using the equation $$f = f_{min} + \sum_{j=1}^{i-1} \overline{w}_j^f + M_i^c\left(c - c_{min} - \sum_{j=1}^{i-1} w_j^c\right).$$

6.4 Space Overhead

The size of the ciphertext depends on the skew in the plaintext and target distributions. Define $g^p_{min}$ to be the smallest gap between sorted values in the plaintext, and $g^p_{max}$ as the largest gap. Similarly, let $g^t_{min}$ and $g^t_{max}$ be the smallest and largest gaps in the target distribution. Defing $G_P = g^p_{max}/g^p_{min}$, and $G_t = g^t_{max}/g^t_{min}$. Then the additional number of bits needed by the ciphertext in the worst case can be approximated as log $G_P$+log $G_t$. Equivalently, an upper bound for $c_{max}-c_{min}$ is given by $G_P \times G_t \times (p_{max}-p_{min})$.

To see why this is the case, consider that when flattening, we need to make all the gaps equal. If almost all the gaps in the plaintext are close to $g^p_{min}$ while only a few are close to $g^p_{max}$, we will need to increase each of the former gaps to $g^p_{max}$, resulting in a size increase of $g^p_{max}/g^p_{min}$. Similarly, there can be a size increase of $t^p_{max}/t^p_{min}$ when transforming the data if most of the target gaps are close to $t^p_{max}$.

Note that we can explicitly control $G_t$ since we choose the target distribution. While $G_P$ is outside our control, we expect that $G_P \times G_t$ will be substantially less than $2^{32}$, i.e. we will need at most an additional 4 bytes for the ciphertext than for the plaintext.

7. Extensions

7.1 Real Values

An IEEE 754 single precision floating point number is represented in 32 bits. The interpretation of positive floating point values simply as 32-bit integers preserves order. Thus, OPES can be directly used for encrypting positive floating point value.

Negative floating point values, however, yield an inverse order when interpreted as integers. Nevertheless, their order can be maintained by subtracting negative values from the largest negative ($-2^{31}$). The query rewriting module (FIG. 1) makes this adjustment in the incoming query constants and the adjustment is undone before returning the query results.

A similar scheme is used for encrypting 64-bit double precision floating point values.

7.2 Duplicates

An adversary can use duplicates to guess the distribution of a domain, particularly if the distribution is highly skewed. Similarly, if the number of distinct values in a domain is small (e.g., day of the month), it can be used to guess the domain. The solution for both these problems is to use a homophonic scheme in which a given plaintext value is mapped to a range of encrypted values.

The basic idea is to modify the flatten stage as follows. First, when computing the scale factors for each bucket using the constraint that the bucket should map to a space proportional to the number of points in the bucket, we include duplicates in the number of points. Thus, regions where duplicates are prevalent will be spread out proportionately, and adjacent plaintext values in such regions will be mapped to flattened values that are relatively far apart.

Suppose that using our current algorithm, a plaintext value p maps into a value f in the flat space, and p+1 maps into f'. When encrypting p, we now randomly choose a value from the interval [f, f'). Combined with the intra-bucket uniformity generated by the linear splines and the inter-bucket uniformity from the scale factors, this will result in the flattened distribution being uniform even if the plaintext distribution had a skewed distribution of duplicates. This is the only change to the algorithm—having hidden the duplicates in the flatten stage, no change is necessary in the transform stage.

Selections on data encrypted using this extension can be performed by transforming predicates, e.g., converting equality against a constant into a range predicate. But some other operations such as equijoin cannot be directly performed. However, this might be acceptable in applications in which numeric attributes are used only in selections. For example, consider a hospital database used for medical research. Patient data will typically be joined on attributes such as patient-id that can be encrypted with conventional encryption. However, numeric attributes such as age and income may strictly be used in range predicates.

8. Evaluation

In this section, we study empirically the following questions:

1. Distribution of Encrypted Values: How indistinguishable is the output of the invention from the target distribution?
2. Percentile Exposure: How susceptible to the percentile exposure are the encrypted values generated by the invention?
3. Incremental Updatability: Does the invention gracefully handle updates to the database?
4. Key Size: How big an encryption key does the invention need?
5. Time Overhead: What is the performance impact of integrating the invention in a database system?

8.1 Experimental Setup

The experiments were conducted by implementing the invention over DB2 Version 7. The algorithms were implemented in Java, except for the high precision arithmetic which was implemented in C++(using 80-bit long doubles). The experiments were run using version 1.4.1 of the Java VM on a Microsoft Windows 2000 workstation with a 1 GHz Intel processor and 512 MB of memory.

8.2 Datasets

We used the following datasets in our experiments:

Census: This dataset from the UCI KDD archive (http://kdd.ics.uci.edu/databases/census-income/census-income.html) contains the PUMS census data (about 30,000 records). We used the income field in our experiments.

Gaussian: The data consists of integers picked randomly from a Gaussian distribution with a mean of 0 and a standard deviation of MAX INT/10.

Zipf: The data consists of integers picked randomly from a Zipf distribution with a maximum value of MAXINT, and skew (theta) of 0.5.

Uniform: The data consists of integers picked randomly from a Uniform distribution between −MAXINT and MAXINT.

Our default dataset size for the synthetic datasets was 1 million values. The plaintext values were 32-bit integers. Both flattened and final ciphertext numbers were 64-bit long.

8.3 Distribution of Encrypted Values

We tested whether it is possible to statistically distinguish between the output of the invention and the target distribution by applying the Kolmogorov-Smimov test used for this purpose. The Kolmogorov-Smirnov test answers the following question [22]:

Can we disprove, to a certain required level of significance, the null hypothesis that two data sets are drawn from the same distribution function?

The Komogorov-Smirnov statistic is defined as the maximum value of the absolute difference between two cumulative density functions. What makes it useful is that the distribution of the statistic in the case of the null hypothesis (being true) can be calculated, thus giving the significance of any observed non-zero value of the statistic. We conservatively try to disprove the null hypothesis at a significance level of 5%, meaning thereby that the distribution of encrypted values generated by the invention differs from the chosen target distribution. (Note that this test is much harsher on the invention than using a stronger significance level of 1%. If the null hypothesis is rejected at a significance level of 5%, it will also be rejected at a significance level of 1%.) In addition to the Census data, we used four sizes for the three synthetic datasets: 10K, 100K, 1M, and 10M values. For each of these input datasets, we experimented with three target distributions: Gaussian, Zipf, and Uniform.

We could not disprove the null hypothesis in any of our experiments. In other words, the distribution of encrypted values produced by the invention was consistent with the target distribution in every case.

We also checked whether the output of Stage 1 (flatten) can be distinguished from the Uniform distribution. Again, in every case, we could not disprove the hypothesis that the distributions were indistinguishable, implying that flattening successfully masked the characteristics of the plaintext distribution.

We should mention here that we also experimented with modeling input distribution using equi-width and equi-depth histograms (with the same number of buckets as in our MDL model). When we applied the Kolmogorov-Smirnov test to check the indistinguishability of the flattened distributions so obtained from the uniform distribution, the hypothesis was rejected in every case except when the input data was itself distributed uniformly. These results reaffirmed the value of using a relatively more complex piece-wise linear function for modeling a density distribution.

8.4 Percentile Exposure

FIG. 6 shows the average change between the original percentile and the percentile in the encrypted distribution. For example, if the plaintext data had a range between 0 and 100, and the ciphertext had a range between 0 and 1000, a plaintext value of 10 that was mapped to a ciphertext value of 240 would have a change of |10-24|, or 14 percentile points. Thus the first line in the figure states that each value moved by 37 percentile points when going from Census to Gaussian. The reason there is relatively less percentile change when transforming Census to Zipf is that Census itself is largely Zipfian. Thus by judiciously choosing a target distribution that is substantially different from the input data, we can create large change in the percentile values, which shows the robustness of the invention against percentile exposure.

8.5 Incremental Updatability

For an encryption scheme to be useful in a database system, it should be able to handle updates gracefully. We have seen that with the invention a new value can easily be inserted without requiring changes in the encryption of other values.

Recall that we compute the bucket boundaries and the mapping functions when the database is encrypted for the first time, and then do not update them (unless the database administrator decides to re-encrypt the database afresh). We studied next whether the encrypted values remain consistent with the target distribution after updates. For this experiment, we completely replaced all the data values with new values, drawn from the same plaintext distribution. But we did not update $K^P$ or $K^c$. We did this experiment with all four datasets.

Applying the Kolmogorov-Smirnov test again, we found that even with this 100% replacement, the resulting distributions were still statistically indistinguishable from the target distributions.

8.6 Key Size

The size of the encryption key K depends on the number of buckets needed for partitioning a distribution, the total size being roughly three times the number of buckets. We found that we did not need more than 200 buckets for any of our datasets (including those with 10 million values); for Uniform, the number of buckets needed was less than 10. Thus, the encryption key can be just a few KB in size.

8.7 Time Overhead

We used a single column table in these experiments. The reason was that we did not want to mask the overhead of encryption; if we were to use wider tuples with columns that were not encrypted/decrypted, our overhead would come out to be lower. The column was indexed.

The model building cost was around 4 minutes for 1 million records. It is a one-time cost, which can be reduced by using a sample of the data.

FIG. 7 shows the overhead due to encryption on database inserts. The "plaintext" column shows the time required to insert 1000 plaintext values, which provides the baseline for comparison.

The "ciphertext" column shows the total time required to flatten the same number of plaintext values, transform them into ciphertext, and insert the ciphertext values into the database. The distribution of plaintext values was Gaussian, and they were encrypted into Zipf values. Clearly, this overhead is negligible.

FIG. 8 shows the impact of decryption on the retrieval of tuples from the database at different levels of selectivity. The encrypted values followed Zipf distribution, and the plaintext values followed a Gaussian distribution. The "ciphertext" column shows the time required to retrieve ciphertext values, decrypting them into flattened values, and then unflattening them into plaintext values. For comparison, the "plaintext" column shows the time required to retrieve plaintext values. The overhead ranges from around 3% slower for equality predicates to around 40% slower when selecting the entire database of 1 million records.

The reason for higher overhead for less selective queries is that the decryption overhead per tuple is roughly constant. However, DB2 has excellent performance on sequential I/O, which reduces per record I/O cost for less selective queries. The percentage overhead due to decryption, therefore, increases. The absolute numbers, however, are very reasonable: less than 2 seconds to decrypt 1 million records.

A general purpose computer is programmed according to the inventive steps herein. The invention can also be embodied as an article of manufacture—a machine component—that is used by a digital processing apparatus to execute logic to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device. The invention can also be embodied as a data management service.

While the particular SYSTEM AND METHOD FOR ORDER-PRESERVING ENCRYPTION FOR NUMERIC DATA as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

REFERENCES

[1] R. Agrawal, J. Kiernan, R. Srikant, and Y. Xu. Hippocratic databases. In Proc. of the 28th Int'l Conference on Very Large Databases, Hong Kong, China, August 2002.

[2] N. Ahituv, Y. Lapid, and S. Neumann. Processing encrypted data. Communications of the ACM, 30(9):777-780, 1987.

[3] G. Bebek. Anti-tamper database research: Inference control techniques. Technical Report EECS 433 Final Report, Case Western Reserve University, November 2002.

[4] L. Bouganimand, P. Pucheral. Chip-secured data access: Confidential data on untrusted servers. In Proc. of the VLDB Conference, p. 131-142, Hong Kong, China, August 2002.

[5] C. Boyens and O. Gunther. Trust is not enough: Privacy and security in ASP and web service environments. In 6th East-European Conference on Advances in Databases and Information Systems, Bratislava, Slovakia, September 2002.

[6] Z. J. Czech, G. Havas, and B. S. Majewski. An optimal algorithm for generating minimal perfect hash functions. Information Processing Letters, 43(5):257-264, 1992.

[7] E. Damiani, S. D. C. di Vimercati, S. Jajodia, S. Paraboschi, and P. Samarati. Balancing confidentiality and efficiency in untrusted relational DBMSs. In Proc. of the 10th ACM Conf. on Computer and Communications Security (CCS), October 2003.

[8] D. Denning. Cryptography and Data Security. Addison-Wesley, 1982.

[9] J. Domingo-Ferrer and J. Herrera-Joancomarti. A privacy homomorphism allowing field operations on encrypted data, 1998.

[10] J. Domingo i Ferror. A new privacy homomorphism and applications. Information Processing Letters, 60(5):277-282, 1996.

[11] J. Feigenbaum, M. Y. Liberman, and R. N. Wright. Cryptographic protection of databases and software. In Proc. of the DIMACS Workshop on Distributed Computing and Cryptography, 1990.

[12] E. A. Fox, Q. F. Chen, A. M. Daoud, and L. S. Heath. Order preserving minimal perfect hash functions and information retrieval. ACM Transactions on Information Systems (TOIS), 9:281-308, 1991.

[13] S. C. Gultekin Ozsoyoglu, David Singer. Anti-tamper databases: Querying encrypted databases. In Proc. of the 17th Annual IFIP WG 11.3 Working Conference on Database and Applications Security, Estes Park, Colo., August 2003.

[14] H. Hacigumus, B. R. Iyer, C. Li, and S. Mehrotra. Executing SQL over encrypted data in the database-service-provider model. In Proc. of the ACM SIGMOD Conf. on Management of Data, Madison, Wis., June 2002.

[15] H. Hacigumus, B. R. Iyer, and S. Mehrotra. Providing database as a service. In Proc. of the Int'l Conf. on Data Engineering, San Jose, Calif., March 2002.

[16] T. Hamilton. Error sends bank files to eBay. The Toronto Star, Sep. 15, 2003.

[17] Y. E. Ioannidis. The history of histograms (abridged). In Proc. of 29th Int'l Conf. on Very Large Data Bases (VLDB), Berlin, Germany, September 2003.

[18] A. Konig and G. Weikum. Combining histograms and parametric curve fitting for feedback-driven query result-size estimation. In Proc. of the 25th Int'l Conference on Very Large Databases (VLDB '99), 1999.

[19] M. Mehta, R. Agrawal, and J. Rissanen. SLIQ: A fast scalable classifier for data mining. In Proc. of the Fifth Int'l Conference on Extending Database Technology (EDBT), Avignon, France, March 1996.

[20] T. M. Mitchell. Machine Learning, chapter 6. McGraw-Hill, 1997.

[21] Oracle Corporation. Database Encryption in Oracle 8i, August 2000.

[22] W. H. Press, S. A. Teukolsky, W. T. Vetterling, and B. P. Flannery. Numerical Recipes in C: The Art of Scientific Computing. Cambridge University Press, second edition, 1992.

[23] J. Rissanen. Stochastic Complexity in Statistical Inquiry. World Scientific Publ. Co., 1989.

[24] R. L. Rivest, L. Adelman, and M. L. Dertouzos. On data banks and privacy homomorphisms. In Foundations of Secure Computation, p. 169-178, 1978.

[25] California's Senate Bill 1386 http://info.sen.ca.gov/pub/01-02/bill/sen/sb1351-1400/sb1386bill20020926chaptered.html.

[26] B. Schneier. Applied Cryptography. John Wiley, second edition, 1996.

[27] D. X. Song, D. Wagner, and A. Perrig. Practical techniques for searches on encrypted data. In IEEE Symp. on Security and Privacy, Oakland, Calif., 2000.

[28] D. R. Stinson. Cryptography: Theory and Practice. CRC Press, 2nd edition, 2002.
[29] R. Vingralek. Gnatdb: A small-footprint, secure database system. In Proc. of the VLDB Conference, p. 884-893, Hong Kong, China, August 2002.
[30] National Institute of Standards and Technology, U.S. Department of Commerce. Digital Signature Standard, May 1994.
[31] R. Rivest. The MD5 message digest algorithm. RFC 1320, April 1992.

We claim:

1. A computer-implemented method for preventing data reconstruction, comprising:
   a computer processor configured to perform:
   partitioning an input data distribution into a plurality of buckets, wherein a width of value ranges vary across the buckets;
   modeling the data distribution within each bucket as a linear spline;
   flattening original input numerical values into a flattened dataset having substantially uniformly distributed values; and
   transforming the flattened dataset into an encrypted dataset having values distributed according to a target data distribution.

2. The computer-implemented method of claim 1, wherein new values are incrementally encrypted while leaving existing encrypted values unchanged.

3. The computer-implemented method of claim 1, wherein the modeling comprises using a minimum description length (MDL) to determine a number of buckets.

4. The computer-implemented method of claim 3, wherein the partitioning includes:
   a growth phase wherein the data space is recursively split into finer partitions; and
   a pruning phase wherein some buckets are merged into bigger buckets.

5. The computer-implemented method of claim 4, wherein the partitioning further comprises creating two special buckets, one at either end of a domain of the input distribution, for encrypting values outside a current data range.

6. The computer-implemented method of claim 1, wherein the flattening comprises:
   defining a mapping function for each bucket including a quadratic coefficient and a scaling factor; and
   retaining all bucket boundaries, quadratic coefficients, and scale factors in a data structure.

7. The computer-implemented method of claim 1, wherein the transforming comprises:
   defining a mapping function for each bucket including a quadratic coefficient and a scaling factor; and
   retaining all bucket boundaries, quadratic coefficients, and scale factors in a data structure.

8. The computer-implemented method of claim 1, wherein a given plaintext value is mapped to a plurality of encrypted values to prevent an adversary from using duplicates to guess the distribution of a domain.

9. A computer system for preventing data reconstruction, the comprising:
   a memory; and
   a processor communicatively coupled to the memory, wherein the processor is adapted to execute a method comprising:
   partitioning an input data distribution into a plurality of buckets, wherein a width of value ranges vary across the buckets;
   modeling the data distribution within each bucket as a linear spline;
   flattening original input numerical values into a flattened dataset having substantially uniformly distributed values; and
   transforming the flattened dataset into an encrypted dataset having values distributed according to a target data distribution.

10. The computer system of claim 9, wherein new values are incrementally encrypted while leaving existing encrypted values unchanged.

11. The computer system of claim 9, wherein the modeling comprises:
    partitioning data into buckets; and
    modeling the data distribution within each bucket as a linear spline.

12. The computer system of claim 11, wherein the modeling comprises using a minimum description length (MDL) to determine a number of buckets.

13. The computer system of claim 9, wherein the partitioning further comprises creating two special buckets, one at either end of a domain of the input distribution, for encrypting values outside a current data range.

14. The computer system of claim 9, wherein the flattening comprises:
    defining a mapping function for each bucket including a quadratic coefficient and a scaling factor; and
    retaining all bucket boundaries, quadratic coefficients, and scale factors in a data structure.

15. The computer system of claim 9, wherein the transforming comprises:
    defining a mapping function for each bucket including a quadratic coefficient and a scaling factor; and
    retaining all bucket boundaries, quadratic coefficients, and scale factors in a data structure.

16. The system of claim 9 wherein a given plaintext value is mapped to a plurality of encrypted values to prevent an adversary from using duplicates to guess the distribution of a domain.

17. A computer program storage product for preventing data reconstruction, the computer program product comprising:
    a storage medium readable by a processing circuit and storing instructions for execution by the processing circuit for performing a method comprising:
    partitioning an input data distribution into a plurality of buckets, wherein a width of value ranges vary across the buckets;
    modeling the data distribution within each bucket as a linear spline;
    flattening original input numerical values into a flattened dataset having substantially uniformly distributed values; and
    transforming the flattened dataset into an encrypted dataset having values distributed according to a target data distribution.

18. The computer program storage product of claim 17, wherein new values are incrementally encrypted while leaving existing encrypted values unchanged.

19. The computer program storage product method of claim 18, wherein the modeling comprises using a minimum description length (MDL) to determine a number of buckets.

* * * * *

UNITED STATES PATENT AND TRADEMARK OFFICE
CERTIFICATE OF CORRECTION

PATENT NO. : 7,873,840 B2
APPLICATION NO. : 12/166351
DATED : January 18, 2011
INVENTOR(S) : Rakesh Agrawal et al.

Page 1 of 1

It is certified that error appears in the above-identified patent and that said Letters Patent is hereby corrected as shown below:

On the Title Page, Item (63) please insert the continuity data as follows:

--The present application is a continuation of prior application Serial No. 10/752,154 filed January 5, 2004 for the invention entitled "SYSTEM AND METHOD FOR ORDER-PRESERVING ENCRYPTION FOR NUMERIC DATA--

Signed and Sealed this
Thirty-first Day of January, 2012

David J. Kappos
*Director of the United States Patent and Trademark Office*